July 25, 1939.  E. S. HINELINE  2,167,436
CAMERA MECHANISM HAVING CORRELATED RANGE AND VIEW FINDER
Filed July 29, 1937  7 Sheets-Sheet 1
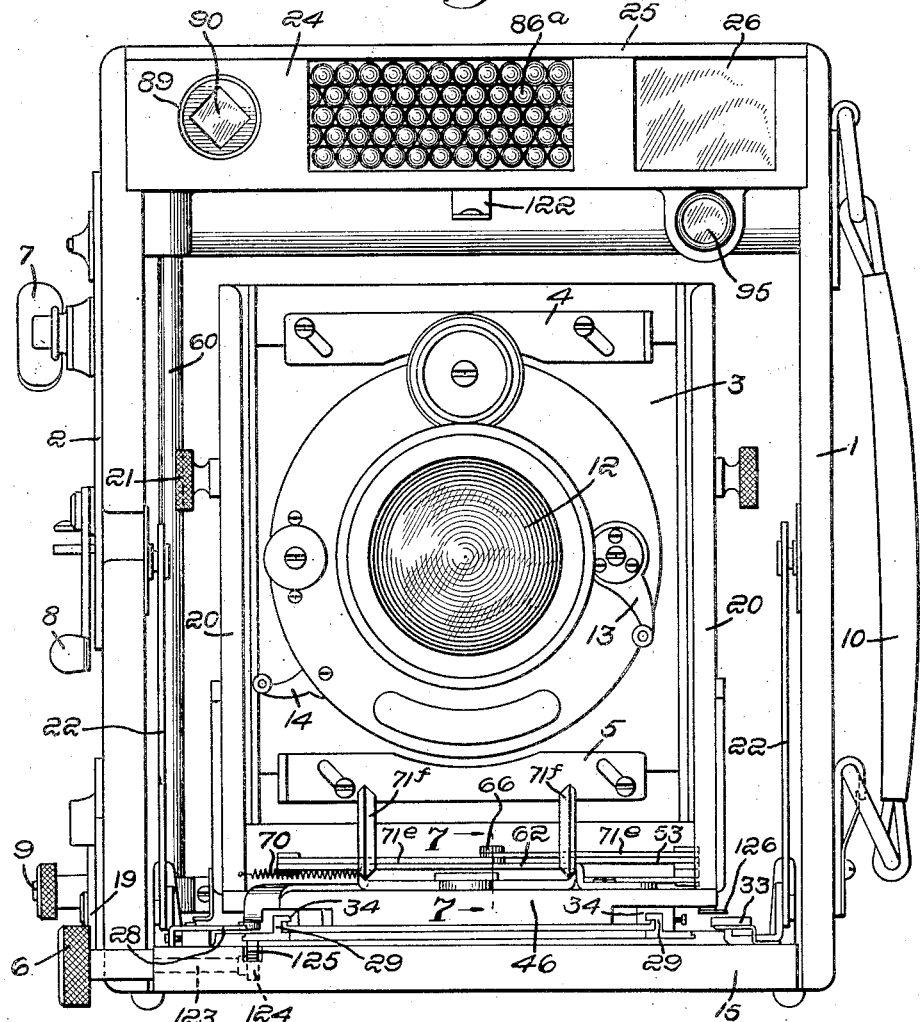
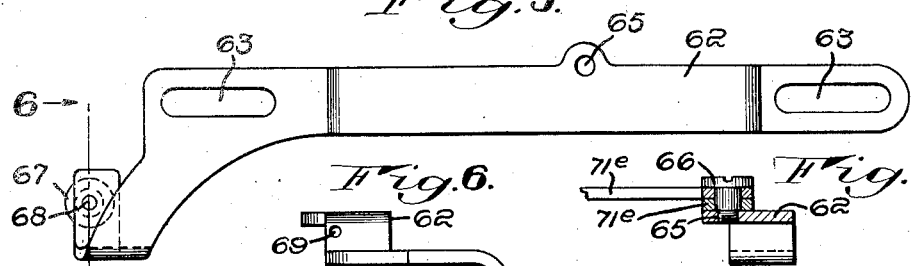
INVENTOR.
Edson S. Hineline
BY Emery, Booth, Townsend, Miller and Weidner
his ATTORNEYS

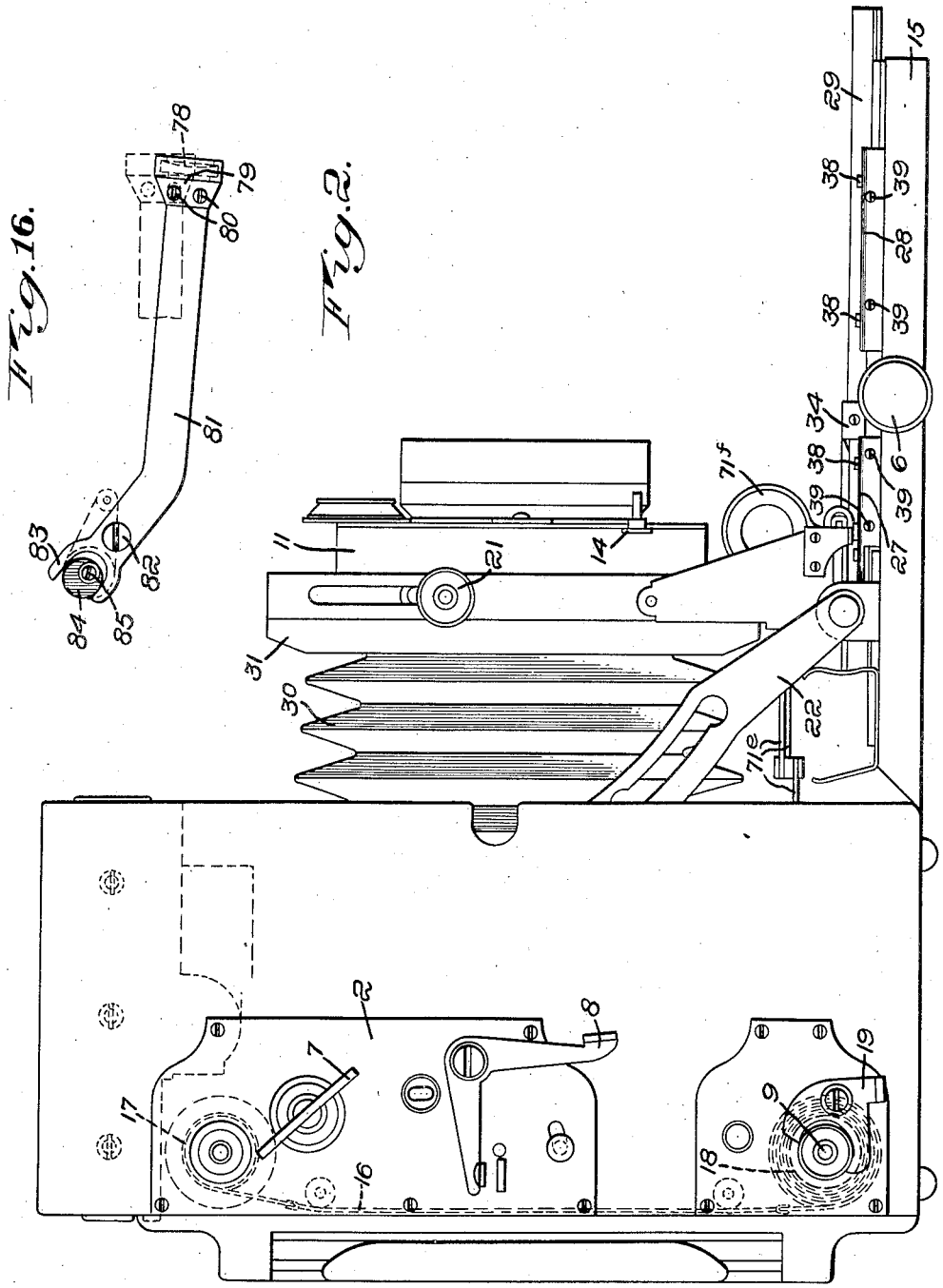

July 25, 1939.　　　　E. S. HINELINE　　　　2,167,436
CAMERA MECHANISM HAVING CORRELATED RANGE AND VIEW FINDER
Filed July 29, 1937　　　7 Sheets-Sheet 3
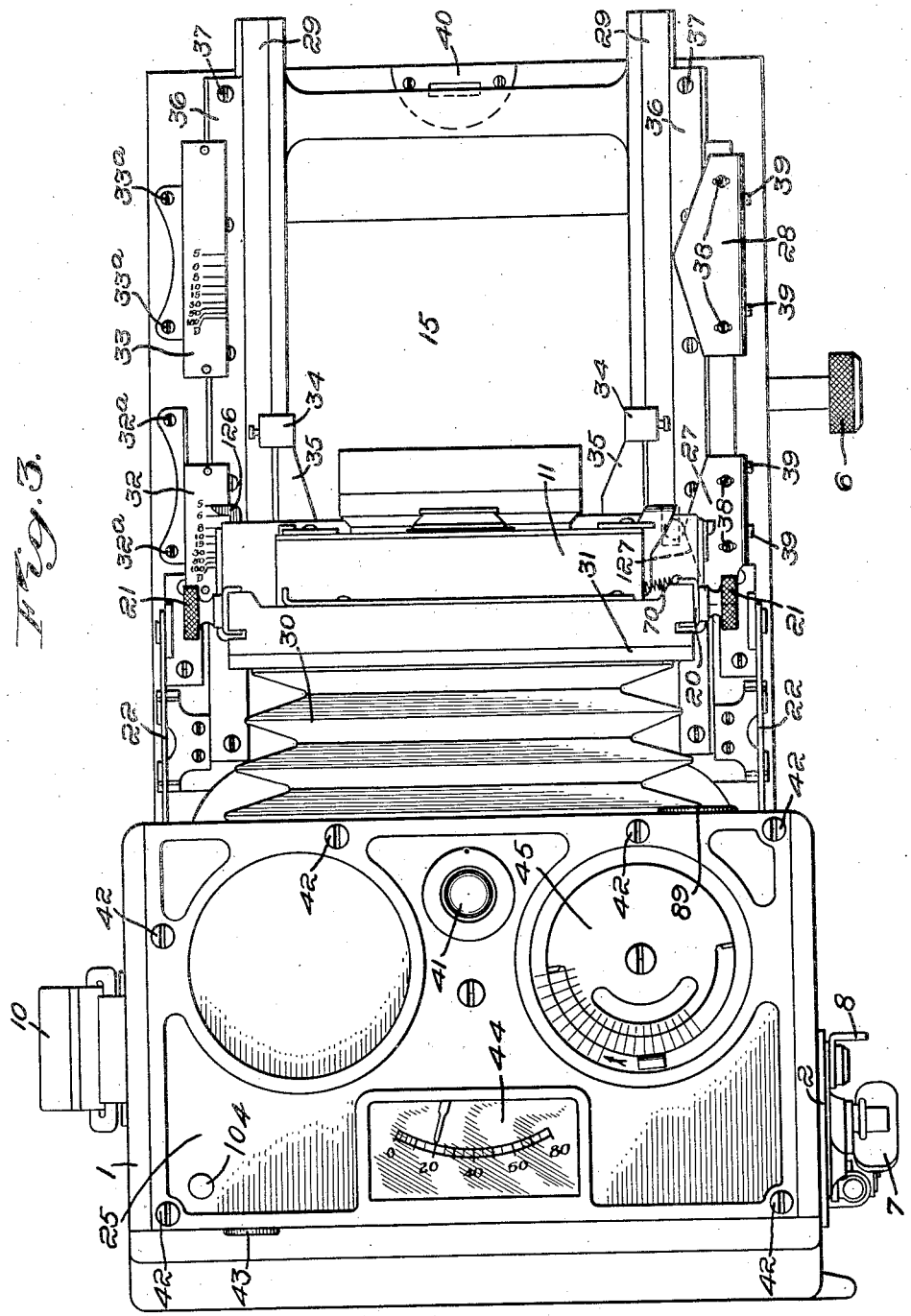
INVENTOR.
Edson S. Hineline
BY
his ATTORNEYS July 25, 1939.  E. S. HINELINE  2,167,436
CAMERA MECHANISM HAVING CORRELATED RANGE AND VIEW FINDER
Filed July 29, 1937  7 Sheets-Sheet 4
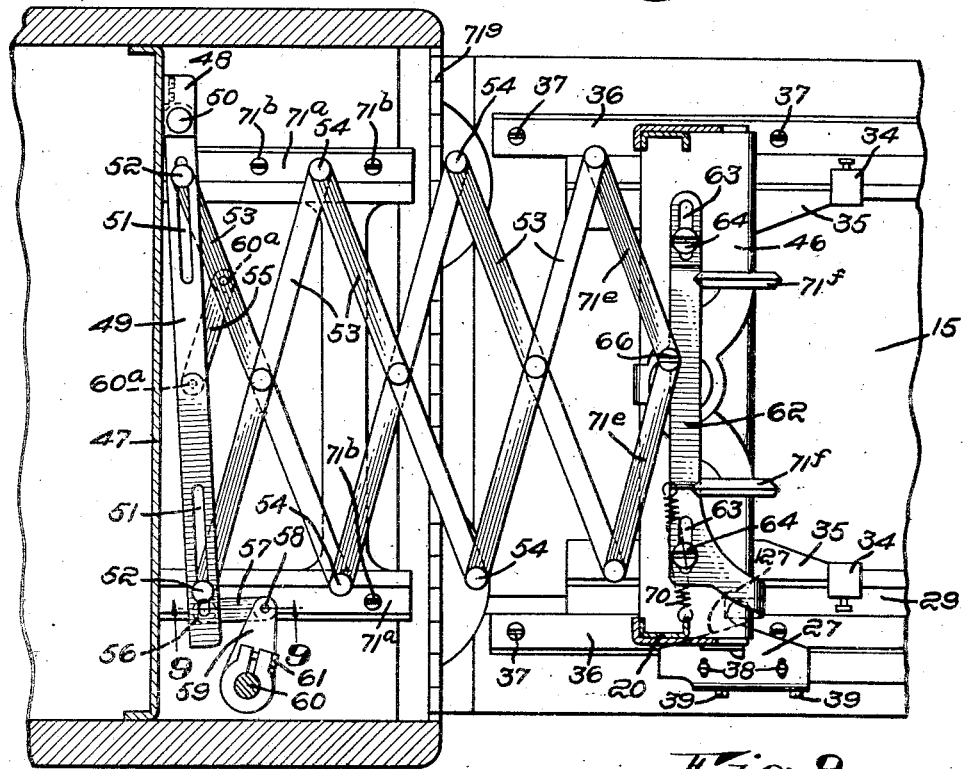
INVENTOR.
Edson S. Hineline
BY
his ATTORNEYS

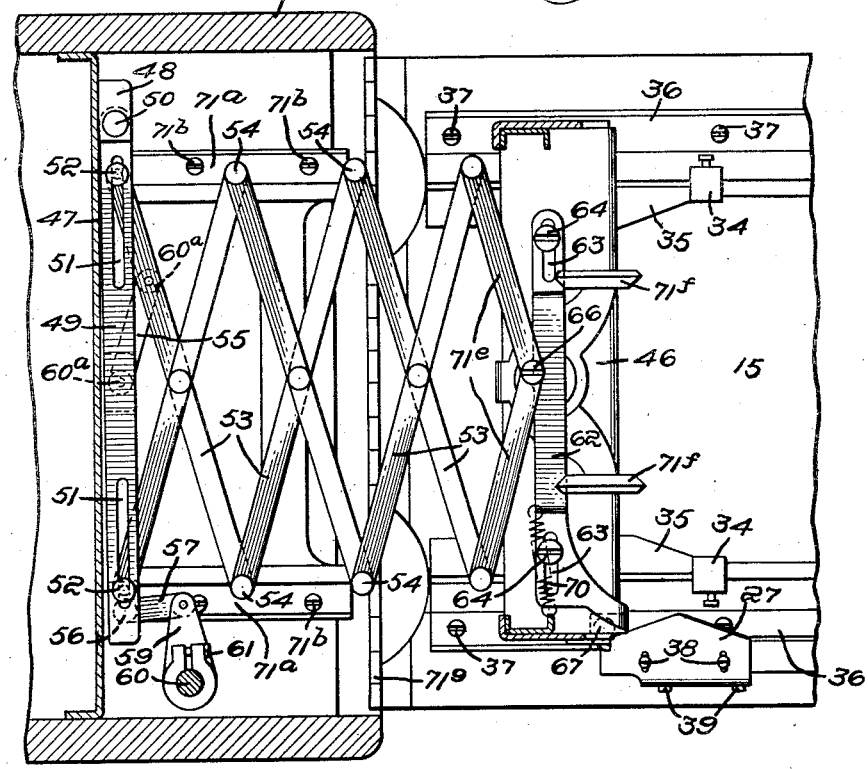

INVENTOR.
Edson S. Hineline

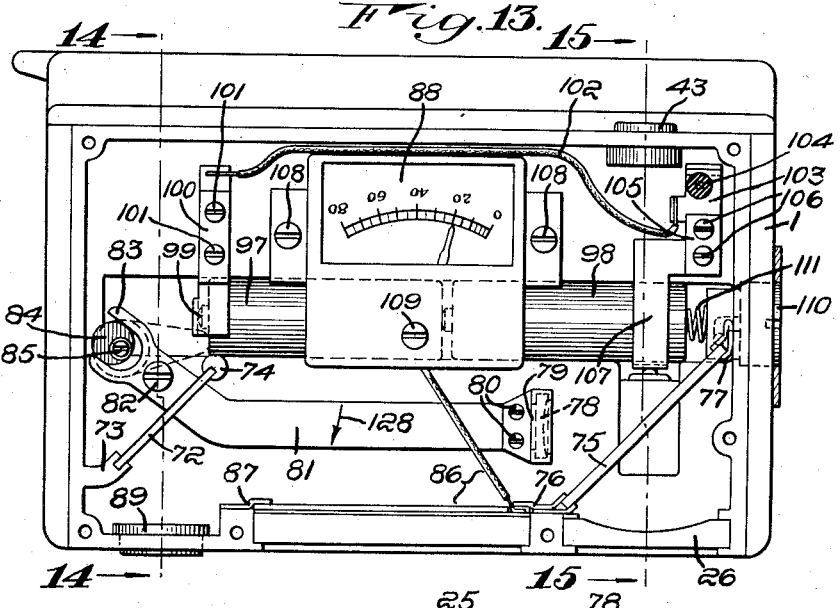

Patented July 25, 1939

2,167,436

UNITED STATES PATENT OFFICE 2,167,436

CAMERA MECHANISM HAVING CORRELATED RANGE AND VIEW FINDER

Edson S. Hineline, Rochester, N. Y., assignor to The Folmer Graflex Corporation, Rochester, N. Y., a corporation of Delaware Application July 29, 1937, Serial No. 156,360

8 Claims. (Cl. 95—44)

This invention relates to a camera having a number of correlating built-in features, but the coordinated feature of the built-in illuminable projector with the built-in range and view finder is wholly claimed in my co-pending application Ser. No. 278,887, filed June 13, 1939, as a true division of this application.

In order that the principle of the invention may be readily understood, I will disclose a single embodiment thereof, to which I am in no wise limited.

The invention relates to a new camera with a number of built-in coordinated features that enable the operator to carry out the various functions in making a photograph with great accuracy and rapidity. One of the preliminary functions is that of positioning the lens in such relation to the focal plane that the image formed at the focal plane will be in sharp focus. There are several methods of doing this, some of which are as follows: (a) focusing on a conventional ground glass screen, or (b) setting the camera to a predetermined scale, either measuring or guessing at the distance, or (c) using an optical device that is interconnected with the moving front part of the camera which normally carries the lens. In the camera herein disclosed this feature or optical device just referred to is built into the camera and is permanently connected at all times. A further requirement in photographing effectively is that the user be able to view the exact image that is being photographed, and it is a great advantage that he be able to view this image while focusing and up to the exact time of exposure. This is also a built-in feature of the camera herein disclosed. Another requirement is for a means of determining the exact exposure for the particular subject that is being photographed. There are a number of auxiliary devices for doing this, but I have by this invention provided an exposure meter of the photo-electric cell type that is built in and is a part of the camera structure.

A further requirement arises when it is necessary to make photographs in places where the illumination is at a very low level, in fact so low that it is impossible to focus either by the conventional ground glass method or with an optical range finder. In the camera herein disclosed there is a built-in projector that will project an image on the object being photographed, and the distance of such image can then be accurately determined by using the optical range finder. When this distance is ascertained the camera will be in exact focus. This feature is not claimed herein but in my said divisional application Ser. No. 278,887, filed June 13, 1939. Various cameras have been built including some of these features, but I believe I am the first to construct a camera including all of the above features each correlating with the other, thus making a complete photographic instrument within itself. Various parts have been so placed that the camera is capable of being folded up very compactly, and at the same time there is made available a bellows length sufficiently long to use lenses of rather long focal length or so that the user is able to work very close to the object. The structure of the camera and its various devices are such that a number of different lenses can be used interchangeably with each other, and the range finder will track accurately with the lens.

A more complete understanding of my invention can be had from the following description in which—

Fig. 1 is a front elevation of the camera with the door open and the bellows extended;

Fig. 2 is a side elevation of the camera with the front door open and the front partially withdrawn to a position that it normally takes when a comparatively short lens is in use;

Fig. 3 is a top plan view of the camera with the door open and the front extended to the position shown in Fig. 2;

Fig. 4 is a horizontal section through a part of the camera showing the coupling mechanism between the front of the camera and the range finder mechanism;

Fig. 5 is an enlarged detail in plan of the cam follower bar;

Fig. 6 is a vertical section through Fig. 5 on the line 6—6;

Fig. 7 is a vertical section through cam follower bar on line 7—7 of Fig. 1 showing the manner of attaching the toggle joint to the cam follower bar;

Fig. 8 is an enlarged detail showing the relation of the cam follower bar and the focusing cam when the camera is in position as in Fig. 3;

Fig. 9 is a vertical section of Fig. 4 on the line 9—9 thereof;

Fig. 10 is a vertical section of Fig. 8 on the line 10—10 thereof;

Fig. 11 is a view similar to Fig. 4 except that the camera front is shown in a position when focused at infinity;

Fig. 13 is a top plan view of the camera with the range finder cover removed to show the arrangement of the various parts that go to make up the range finder, and also showing the location of the photoelectric cell, the photoelectric cell meter, the placement of batteries and the battery contact mechanism;

Fig. 14 is a vertical section of Fig. 13 on the line 14—14 thereof;

Fig. 15 is a vertical section of Fig. 13 on the line 15—15 thereof;

Fig. 16 is a detail in plan of the lens carrying arm;

Fig. 18 is a schematic diagram of the range finder when employing the projector.

Figure 12:
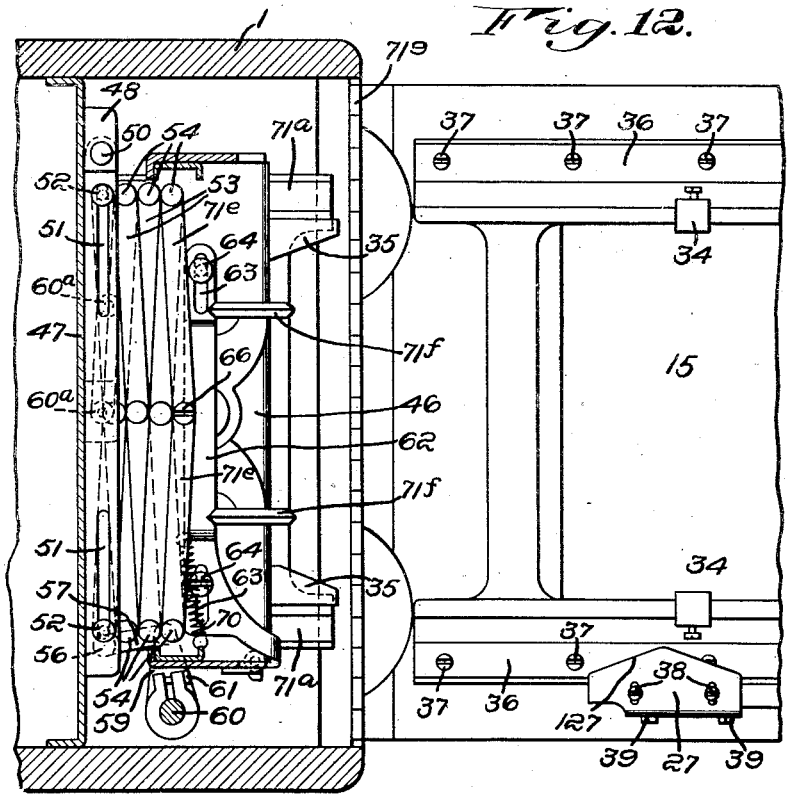
Fig. 12 is a view similar to Fig. 4, but showing the parts as positioned when the front is completely collapsed preparatory to closing the camera.

The invention is particularly directed to a camera having built thereinto as correlated features a range and view finder, an exposure meter, and a focusing projector, all of which are so coordinated as to provide a camera meeting all requirements of accuracy and rapidity of performance and yet capable of being collapsed or closed into small compass. Briefly stated, the three features which are herein disclosed as built into the camera in such manner that they combine in producing the desired results, are a range and view finder, an exposure meter, and a projector which enables the range finder to be employed even though the light is so poor that proper focusing could not be done either with an ordinary optical finder or upon ground glass.

The feature of the projector is, however, wholly claimed in my said divisional application Ser. No. 278,887, filed June 13, 1939.

I am aware that in combination range finders and view finders, it has long been common to use in the optical group two mirrors, both of which are in some cases stationary or one of which is mounted for rocking movement as in the German patent to Alard du Bois-Reymond, No. 188,342, September 23, 1907, and in the United States patent to Woodbury, No. 1,238,473, August 28, 1917. The range finder herein disclosed differs from all those of the prior art known to me in a number of respects which will be pointed out in detail and which include the mounting of a negative lens between two stationary mirrors, the said negative lens being operatively connected to the movable front or front standard of the camera.

In the ensuing description, I will set forth numerous advantages that flow from my invention, the selected embodiment of which is herein shown. Without limiting my invention to the structure herein disclosed, I will now specifically refer to the selected embodiment or example of my invention.

The box or casing of the camera is indicated at 1 in the various figures wherein the same is shown. It may be of any suitable character and construction, although it is herein indicated as the so-called "Press" type of camera, commonly known as the Speed Graphic Camera, to which type of camera my invention is not limited, it being merely the selected embodiment of the invention. The shutter plate of the camera is indicated at 2 in Fig. 2 and elsewhere. As most clearly appears in Fig. 1, the lens board is represented at 3, the upper latch for said lens board at 4, and the lower latch therefor at 5. The focusing knob is represented at 6 and the focal plane shutter winding knob at 7 in Figs. 1 and 2. The release for the focal plane shutter is represented at 8 in said figures, and the tension knob for the focal plane shutter at 9. The carrying handle for the camera is indicated at 10, and the between-the-lens shutter is indicated at 11 in Fig. 2. The objective lens is represented at 12 in Fig. 1, the shutter set lever at 13, the shutter release at 14, the camera bed at 15, wherever it appears throughout the drawings. The focal plane shutter curtain is shown in dotted lines in Fig. 2 at 16, the upper curtain roller for the said focal plane shutter is shown at 17, also in dotted lines, the focal plane curtain tension roller is shown at 18, and the tension release pawl is indicated at 19.

In Fig. 1, the front side rails of the camera are indicated at 20, the camera-front lock nut is indicated at 21 in Fig. 2, the front side brace is indicated at 22, and the camera front clamp at 71f. The foregoing features may be of any usual or suitable construction and need not be more particularly described.

Figure 17:
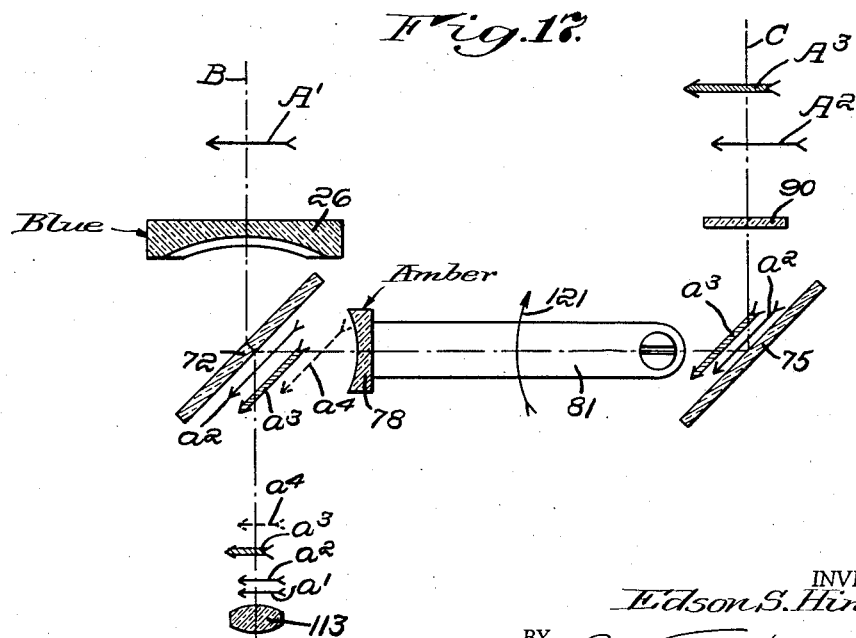
Fig. 17 is a schematic diagram of the operation of the range finder as used in daylight.

The camera is provided with a combined range and view finder, which will be described in detail hereinafter. The housing therefor is represented at 24 in Fig. 1, and in greater detail in Figs. 13, 14 and 15. It is provided with a cover plate 25 and with a view and range finder lens 26, which, as clearly indicated in the diagrams Figs. 17 and 18, is a negative lens.

The said range finder is a combination view finder and range finder by which I mean that the exact image is seen at all times through the lens 26 when the range finder adjustment is taking place. Thus the operator is viewing the subject up to the instant of making the exposure. The said view finder 26 is also one element of the range finder itself. The elements that go to make up the range finder are more particularly described hereinafter.

In order to provide operating means for the range finder, I have preferably employed two cams indicated at 27 and 28 in Fig. 3, and elsewhere, and which I term range finder focusing cams. The cam 27 is positioned for short focus lenses and the cam 28 for long focus lenses. I may within the scope of my invention employ a single variable cam for this purpose and change the position thereof from that indicated in the several figures for cam 27 to the position shown therein for the cam 28. I prefer, however, to employ two different cams.

The camera is provided with a front track, clearly shown at 29 in Fig. 2 and in other figures. The camera bellows is indicated at 30 and the front board for the bellows at 31. In Fig. 3 there is indicated at 32 a focusing scale which functions when using short focus lenses. It is held in position by screws 32a. In the same figure I have indicated at 33 a focusing scale which functions when using long focus lenses. It is held in place by screws 33a.

The so-called infinity stops are indicated at 34, particularly in Figs. 2, 3 and 4, and the camera-front track shoes are indicated at 35. The track guide rails for the camera are indicated at 36, and the retaining screws therefor at 37. I have provided lock screws for the range finder focusing cams, the same being represented at 38 in the several figures, and which are employed for securing in position both the focusing cams 27 and 28. I also provide in this connection focusing-cam adjusting screws shown at 39. The latch plate for the hinged front or door of the camera is indicated at 40 in Fig. 3. Cooperating therewith is a release button 41, also shown in the said figure at the left. Adjacent thereto and suitably distributed are retaining screws 42 for the range finder cover 25. At the extreme left in said Fig. 3, the range finder eye piece is indicated at 43. It is also shown in Fig. 13. Adjacent thereto, there is represented at 44 the photocell meter which will be more particularly referred to hereinafter. The exposure calculator is indicated at 45.

Before describing in detail the range and view finder itself, I will first describe the preferred means for operating the movable element thereof, namely, the negative lens positioned between two stationary mirrors. In order to move the said lens in causing the range finder to function, I may provide (though my invention is not limited thereto) substantially the same means for connecting said movable element with the front or front standard of the camera that I employ in my co-pending application Ser. No. 155,259, filed July 23, 1937, for turning the pivoted mirror in the optical group shown in said application. My invention is not limited to the employment of any particular means for causing the conjoint movement of the camera front and the movable member of the optical group. As stated, however, I may employ substantially the same connecting means, and I will now proceed to describe the same specifically without limiting my invention thereto, and in this connection I will refer particularly to Figs. 4 to 9 inclusive.

The so-called front standard or movable front of the camera is indicated at 46. The rear bellows frame is indicated at 47 and attached thereto is a bracket 48 for the base rod or bar 49 of the toggle mechanism. The said rod or bar 49 is pivoted to the bracket 48 by a suitable rivet 50, and is provided with two lengthwise extending slots 51, which receive rivets 52, 52 that are provided upon the innermost of the toggle arms 53, 53. A number of toggle arms 53 are indicated which are all suitably connected by rivets 54. There is also provided a toggle arm centering link at 55 which connects the rod or bar 49 with one of the toggle arms 53, as clearly indicated in the several figures. Extending from and suitably connected thereto by a rivet 56 is a toggle-arm-mechanism-connecting link 57 that is also connected by rivet 58 to an arm 59 upon the range finder control rod or shaft 60, which is mounted in the camera casing in an upright position close to one wall of the camera casing, as best shown in Fig. 1, and in a manner similar to that disclosed in my said application Ser. No. 155,259. As clearly shown in Figs. 4, 11 and 12, there is provided a clamp screw 61 for securing the arm 59 upon the said rod or shaft 60.

The two slots 51, 51 allow the rivets 52, 52 to slide toward the lengthwise center of the rod or bar 49 or away from the said center depending upon the distance the toggle joint has been separated. In order that the toggle joint mechanism may always travel centrally with respect to the rod or bar 49, the short length bar 55 is provided, as already stated. It is attached to one of the toggle bar arms 53 and to said bar 49 by shoulder rivets 60a, 60a.

Mounted transversely upon the camera front or front standard or upright 46, I have provided a cam follower arm or member 62 which is provided with lengthwise extending slots 63, 63 in which are received screws 64, 64 for retaining the same but permitting it to be moved in the direction of its axis under the influence of focusing cam 27 or 28, as the case may be. The said arm or member 62 is provided with a threaded hole 65 shown in Fig. 5 for the reception of a toggle arm connecting screw 66, by which the said arm or member is connected to the toggle mechanism. The said arm or member 62 is provided with a cam follower roller 67, shown most clearly in Figs. 5 and 6, and which is held to the arm or member 62 by a shoulder screw 68. There is also provided in said bar or member a hole 69, shown in Fig. 6 for the reception of a spring 70 by which the roller 67 is held in contact with the cam formation of the cam 27 or cam 28. The other end of the said spring 70 is secured in an opening 71 in one of the camera front side rails 20.

It will be very clearly seen that any movement in a lengthwise direction of the cam follower bar 62 (that is, a movement transversely of the camera) will transmit movement to the toggle joint bar 49 and thence through the link 57 and arm 59 to the range finder control rod or shaft 60.

As clearly shown in Fig. 4 and elsewhere, the camera case 1 is provided in the box portion thereof with a short section of track indicated at 71a, 71a, fastened to the said box structure by screws 71b. On the camera bed or door 15 are fastened camera track rails 36, 36 by screws 37, 37. The camera tracks 29, 29 slide in the said rails 36, 36 and are caused to move forward and backward by means of the focusing knob 6, previously referred to.

It will be understood that as the camera front or upright 46 is pulled forward, the cam roller 67 of the arm or member 62 will ride upon the edge of the focusing cam 27, or cam 28, as the case may be, causing the said cam follower arm or member 62 to move in a direction transverse to the longitudinal axis of the camera. This motion is transmitted through the screw 66, the short arms 71e, 71e, and the longer arms 53 of the toggle joint mechanism, through the rivets 54 to the toggle joint slotted rod or bar 49, the connecting link 57 and the arm 59 to the control rod or shaft 60. Thus the inward movement of the camera front or upright 46 collapses the entire toggle arm structure.

It will be understood that in the foregoing movements the roller 67 follows the edge of the focusing cam 27 or cam 28, causing the cam follower arm or member 62 to move in such manner as to move the slotted toggle bar 49 toward the back of the camera. Through the link 57 and the lever arm 59 a counterclockwise motion is imparted to the range finder rod or shaft 60.

When the camera is closed for transportation or otherwise, the camera front or upright 46 is caused to be slid all the way back by squeezing toward each other the camera front locks, indicated at 71f, 71f in Figs. 1, 4, 11 and 12, which causes the camera track shoes 35 to be pulled toward each other and thus to be released from the tracks 29 and allowed to slide freely thereon. When the camera locks 71f, 71f are squeezed toward each other and the camera front mechanism is pushed back, the shoes 35, 35 override the tracks 71a, 71a within the camera casing or box, thus allowing the camera to be completely folded into the condition appearing in Fig. 12, after which the camera door or bed 15 is swung upon the hinge 71g into closed position.

I will now describe the range and view finder itself and the optical group thereof, and for this purpose I will refer particularly to Figs. 13, 14 and 15.

In Fig. 13, what I term a first-surface mirror is indicated at 72. It is supported in the housing 24 of the range and view finder by a lug or boss 73 formed on the wall thereof, and a stud 74. Thus the said mirror is stationarily mounted. The other mirror, which I term a semitransparent mirror is indicated at 75. It also is stationarily mounted, being for the purpose held in a front bracket 76 and a rear bracket 77 secured to the housing 24. By "semitransparent" mirror, I mean one that has a coating whose ratio of reflection to transmission is controlled by the amount of coating. The said two mirrors 72 and 75 are mounted parallel to each other, but the axis of each is at ninety degrees to the axis of an intermediate negative lens 78, which is mounted in a bracket 79. The said bracket is secured by screws 80 to an arm or lever 81 that is pivoted on a shoulder screw 82 mounted in the housing 24, and which at its end opposite the negative lens 78 is forked as indicated at 83 to receive a cam 84 attached by a screw 85 to the upper end of the range finder control rod or shaft 60, hereinbefore described.

Before proceeding to describe certain additional features of the said range and view finder and the manner in which the same function, I will describe certain parts which are mounted in the said housing 24 and which are correlated with and function with the range and view finder as hereinafter more fully set forth.

I have somewhat diagrammatically indicated a photoelectric cell at 86, the lens whereof is indicated at 86a in Fig. 1, said cell being mounted in a bracket 87, being most clearly shown in Fig. 13. I am, of course, aware that exposure meters of various types have been employed in photography. The one which I employ is of a standard photoelectric cell type using a milliameter as an indicating device. I have, however, so mounted a cell of that type that the reflected light which is measured thereby is substantially the same as the light that passes through the camera lens to make a photograph. This I regard as exceedingly important inasmuch as in the use of all the exposure meters of the prior art with which I am familiar it is impossible to measure the light accurately from the same point as that from which the photograph is being made. In other words, in the common photoelectric cell type of exposure meter, it is necessary for the user to approach quite close to the object being photographed and to measure the light and then to return to the picture-making position in order to make the exposure. Therefore, there is quite an element of guess or of personal equation as to what the actual distance from the object should be in making the photograph.

The photoelectric cell herein disclosed, although generally of a standard type, is so constructed by me that the acceptance angle of the light entering the photoelectric cell is substantially the same as that of the angle of the lens making the photograph. Therefore, I obtain a true reading on the exposure milliameter which I have indicated at 88 in Fig. 13, from whatever position the camera has when the exposure is being made.

In Fig. 14 there is shown the range finder aperture ferrule at 89, which receives therein the range finder glass 90 held in place in the ferrule by a ring 91.

I will now proceed to describe matter which is, however, wholly claimed in my said divisional application Ser. No. 278,887, filed June 13, 1939.

In making pictures with the ordinary optical finder or in focusing on the ground glass of the camera when the light is very poor, such operation often takes place with the aid of photoflash bulbs or photoflash powder combinations. In order to enable me, however, to use the present camera at all times regardless of light conditions, and so that regardless of said light conditions the camera can always be accurately focused on whatever subject is being photographed, I have provided a projector which, as will be fully appreciated from the following description, coordinates and cooperates with the range finder. For that purpose I have provided the following mechanism which is most clearly shown in Figs. 13, 14 and 15.

In the casing 24 of the range finder is provided, as most clearly shown in Fig. 15, a projector housing or barrel 92 which carries a very small or miniature bulb 93 with a tiny coil filament 94. In front of the said filament is placed a lens 95 held in the projector housing or barrel by a ring 96. The position of the filament 94 in said bulb with respect to the magnifier lens 95 is such that for all distances greater than five feet, the image of the filament 94 in said bulb 93 is projected in universal focus. The bulb 93 is not intended to illuminate the scene or object being photographed, but its function is to project an image of the said filament 94 of said bulb onto whatever object is to be photographed. The range finder herein disclosed, in turn, then picks up the image of the filament 94 of the bulb 93 and the focusing adjustment is made precisely as when focusing in daylight. I am entirely familiar with several types of focusing devices wherein the filament is projected for focusing purposes either through the lens of the camera that makes the picture or by some other type of lens mechanism where the focal length of such lens was very close to the focal length of the camera objective lens. In such cases of the prior art, however, the operator necessarily focused the image projected through whatever means is employed, onto the object that is being photographed, and the error necessarily was always very great because the further away the object being photographed was from the camera, the less accuracy could be had in focusing the image on the filament.

In the practice of my invention, the focus that is obtained on the filament is in reality of no importance, for the focusing of the filament may be considerably in error and yet a very sharp focus on the camera lens with respect to the camera plate or film is obtained through the range finder.

The projector is provided with two batteries 97, 98 of the flashlight type. A rear battery contact is provided at 99, as most clearly shown in Fig. 13. A battery contact insulating strip is provided at 100 held in position by screws 101, 101. The battery contact wire is indicated at 102. The upper switch plate of the battery is indicated at 103 in Fig. 13 and the switch plunger at 104. A switch plate insulating block is provided as shown at 105, most clearly shown in Fig. 15, held in position by screws 106. The lower switch plate is represented at 107 and the photoelectric cell meter retaining screws are shown at 108 in Fig. 13. In the same figure the zero adjustment screw for said meter is indicated at 109 and at the extreme right in said figure the battery retaining plug is indicated at 110, and the battery retaining plug contact spring is represented at 111. In Fig. 14, the lower insulating block is represented at 112.

As most clearly shown in Fig. 15, there is provided an eye piece lens 113 which is held in position by a ring 114 in the range finder eye piece or ferrule 43.

The projector bulb 93 is held in position by a screw 115 and the entire projector assembly, housing or barrel 92 is held in position in the range finder element by a retaining screw 116. There is also provided, as shown most clearly at the left in Fig. 15, a switch insulating center block at 117 and a lower insulating switch block at 118.

The two batteries 97, 98 are sufficient to illuminate the lamp bulb 93. The circuit is readily traced through the battery 98, battery 97, contact 99, wire 102, switch plate 103, switch plate 107, to the bulb contact 119 in Fig. 15.

The structure of the switch 104 is most clearly shown in Fig. 15, and is there indicated as a button. When the same is in the upper position as indicated in said figure, no current can flow from the contact 103 of Fig. 13 to the contact 107. When the said button 104 is pushed downward the contact 103 engages the contact 107, thus allowing the current to flow through the lamp 93, through the contact 119, through the bulb 93, through the lamp or bulb base thereof, through the projector barrel or housing 92 to the range finder casting or housing 24. In the said range finder housing 24, there is provided, as already stated, the plug 110 with the attached spring 111, thus making the final contact to the battery.

Having thus described the structure of the photoelectric meter and the projector as the same are built into the range and view finder housing, I will next refer to certain other features of the range finder and describe more fully the functioning thereof.

The cam 84 previously described as attached to the upper end of the range finder control rod or shaft 60 provides the means whereby the arm or lever 81 is swung upon its pivotal shoulder screw 82. The negative lens 78 carried by the inner end of the said arm 81 has substantially the same curvature as the view finder lens 26. When the negative lens 78 is in the so-called infinity position, it is with respect to its axis at an angle of ninety degrees with respect to the first-surface mirror 72.

I have discovered that by making elements of the range finder of dissimilar colors and particularly by making the lens 26 and the negative lens 78 of dissimilar colors, I obtain a result greatly facilitating the accurate setting or functioning of the range finder. While I am not limited in my selection of colors, I desirably form the lens 26 of blue glass and the lens 78 of yellow or amber glass. The said two colors are an example of so-called complementary or antagonistic colors which when mixed or blended produce white or gray light. Other complementary colors are red and verdigris, orange and greenish blue, green-yellow and violet, green and purple, and bluish green and carmine. I preferably, however, use blue glass for the lens 26 and a yellow or amber glass for the negative lens 78.

When the camera is out of focus, the general view as seen on the lens 26 through the eyepiece lens 113 (Fig. 15) is of a bluish color. The displaced image is reflected through the mirror 72 and through the negative lens 78, is then reflected by the mirror 75, and when viewed through the lens 113 is of a yellow color. When the two images exactly overlie or are superimposed one upon the other, the resulting color returns to normal, and there is a considerable stepping up in the brilliancy of the two images. In other words, when exact register is obtained, the image as viewed through the lens 113 is very much clearer than is either the image as viewed on lens 113 or on lens 78 when the two images are displaced.

Other color combinations may be used instead of the blue and yellow or amber preferred by me, but my experimentation shows that a blue lens 26 and a yellow or amber lens 78 provide the best results.

The operation of the optical elements of the range finder when making an exposure in daylight and when not using the projector is clearly shown in Fig. 17, to which I will next refer.

It will be asummed for purposes of description, but not of limitation, that the negative lens 26 is of blue glass and the movable negative lens 78 is of yellow or amber color as marked in Fig. 17. The said negative lens 78 is of substantially the same focal length as the negative lens 26. The first-surface mirror is indicated at 75 and the semitransparent mirror at 72. I have indicated at 90 in Fig. 17 and also in Fig. 1, a piece of glass which is placed in the range finder housing and is used merely as an enclosure to prevent dust from reaching the mechanism. In said Fig. 17, I have represented at right and left arrows A', A2. They are shown as spaced in said figure, but in reality they represent a single object at infinity. The dotted lines B and C, although represented as parallel, in reality converge at an indefinite distance. An image of the arrow A' at the left is formed on the lens 26, and when viewed through the magnifier 113 is seen through the mirror 72 and will appear in the magnifier 113 as the small arrow a' adjacent to said magnifier 113. The same image, but which is indicated as the arrow A2 at the right, will be viewed through the glass 90 on the mirror 75, will be reflected therefrom and will appear as an image formed on lens 78, will be reflected by the mirror 72, and will be viewed through the magnifier 113, appearing as the small arrow a2 adjacent the arrow a' near the magnifier 113. The said two arrows a' and a2 near the magnifier lens 113 now exactly overlie each other and the camera is in focus at infinity.

When focusing at a nearer distance, the arrow A' is viewed through the lens 26, and again will be viewed as the said arrow a' through the magnifier lens 113. The secondary image A2, however, will be displaced as indicated by the arrow A3, shown with a hatched shaft. It will be reflected by the mirror 75, an image will be formed on the negative lens 78 which will be reflected by the mirror 72, and will be viewed as the adjacent arrow a3 (appearing with a hatched shaft) through the magnifier 113. If the lever arm 81 be swung in the direction of the arrow 121 thereon (which action takes place by reason of the movement of the camera front forward with the objective lens through the range finder connecting mechanism, as previously described), such action will cause the said arrow a3 to move into the position of the dotted line arrow a4 adjacent the magnifier lens 113. It will be reflected by mirror 72 and will be viewed through the magnifier 113 as such dotted line arrow a4 adjacent the magnifier lens 113. The arrows a4 and a' exactly overlie each other under these conditions, and the camera will be in focus for whatever distance the object represented by the arrows A' and A2 is from the camera. Adjacent the mirrors 72 and 73 I have indicated, in their corresponding positions, the arrows above referred to.

I will now refer to the operation when focusing the camera under what I term insufficient light conditions and in that connection will refer to the diagram, Fig. 18. I have in the foregoing description fully set forth that a projector, such as the bulb 93 with filament 94, is provided which can be illuminated by pushing down the button 104. The image of the filament 94 is projected through the magnifier lens 95 and will fall on the object being photographed. I have represented in all cases in Fig. 18 a wavy line instead of an arrow, but I have used the same character designations, and it will be unnecessary to repeat the description of the operation, which will be understood from the foregoing. The focusing of the camera will take place exactly as previously described excepting that wavy lines take the place of the arrows in Fig. 17.

I have in the foregoing part of the specification indicated that instead of employing two focusing cams 27 and 28, I may adjust lengthwise the camera bed 15 the focusing cam 27. It is to be understood, however, that this could be done only if the cam to be adjusted lengthwise the camera bed is itself provided with means for varying or adjusting the edge thereof, inasmuch as the cam shape necessarily varies with each lens of a different focal length. Therefore, in practice each focusing cam is used only for a lens of a given focal length. Within the scope of my invention, however, I may provide a focusing cam which itself has a form or edge that can be varied or adjusted and therefore adapted to be used in different positions along the camera bed.

I will now briefly refer to the manipulation of the camera the structure whereof has been fully described.

The door 15 of the camera, which when opened out constitutes the bed thereof, is opened by first pressing the button 41, shown in Fig. 3. This depresses a latch 122 shown at the top of Fig. 1, so that said latch is disengaged from the bed latch plate 40 of Fig. 3. The door 15 can now be opened and the camera will appear as in Fig. 1. The camera front 46 is now pulled outwardly from the camera box by squeezing toward each other the camera bed locks 71f. The camera front is pulled out until the track shoes 35 contact with the infinity stop blocks 34 on the tracks 29. The camera front 46 will then be in the position shown in Fig. 11, which is the infinity position for the lens when using range finder cam 27 with a short focus lens. However, the camera from 46 can be moved further forward by turning the knob 6 which, as clearly shown in dotted lines in Fig. 1, is attached to a shaft 123 carrying a pinion 124. Said pinion meshes with a rack 125 attached to the camera tracks 29. By turning the said knob 6 in a clockwise direction, the tracks 29 are caused to move forward as shown in Fig. 2, carrying therewith the camera front 46, the camera front rails 20, the front bellows frame or board 31, the shutter 11 and the lens 12. The bellows 30 being attached to the bellows frame or board 31 is also moved forward. When the camera front 46 with the said parts is moved forward to the position shown in Figs. 2 and 3, the adjustment is correct for making an exposure as indicated by the focusing scale 32 for a distance of five feet. By merely turning the focusing knob 6 forward or backward, the camera front 46 with the objective lens, etc., can be adjusted to any position from five feet to infinity, as shown on the said scale 32. When using a camera for known distances, this method of operation is quite satisfactory without using the range finder. The foregoing description of operation applies when the camera is equipped with a short lens, such as a 5¼" on a 3¼ x 4¼ camera. If, for example, the camera is changed to a 6½" lens, the infinity blocks 34 are accordingly changed, so that the pointer 126 of Fig. 3 will rest on the infinity position on the focusing scale 33 instead of on the focusing scale 32, as indicated on Fig. 3. The camera front 46 can then be moved to any position along the scale 33 by turning the focusing knob 6 in the manner described.

As already stated with reference to Fig. 13, any motion imparted to the range finder control rod or shaft 60 is transmitted to the cam 84 and will cause a movement of the negative lens supporting arm or lever 81. If the camera front 46 is moved in the forward direction, or for taking a photograph at a close distance, the cam roller 67 is caused to travel up on the cam face 127 of the cam 27, as indicated in dotted lines in Fig. 8, causing the rod or bar 49 of the toggle mechanism to be moved in a lengthwise direction toward the top of the sheet viewing Figs. 4 and 8, thus imparting clockwise motion to the range finder control rod or shaft 60. Also a clockwise motion is imparted to the cam 84 which causes the arm or lever 81 to be moved in the direction of the arrow 128 on Fig. 13.

While I have shown and described in detail certain mechanical connections between the movable camera front 46 and the range finder control rod 60, it is to be understood that I am not limited to the use of said mechanical connections, but that such other means may be substituted as will provide for the correlative movement of the said parts, the illustrated means having been selected merely as one example or embodiment of means that may be employed for the purpose.

The camera herein disclosed is of a structure and design such as used by newspaper men and sports photographers and by others who find it necessary to have a very compact camera with which it is possible to obtain a picture of a fairly large size. It is necessary that such a camera have all the correlating features that are herein described as a part of the invention.

Having thus described one illustrative embodiment of the invention, it is to be understood that although specific terms are employed, they are used in a generic and descriptive sense and not for purposes of limitation, the scope of the invention being set forth in the following claims.

I claim:

1. A combined view and range finder and camera mechanism functionally equipped therewith having, in combination, a camera casing provided with a wall adapted to be opened out for use as a bed, said casing having therein a front support for the objective lens, movable to and fro for focusing purposes along said bed, a combined view and range finder attached to the camera casing and having two fixed mirrors and a negative lens therebetween movable in the functioning of the range finder, and also having a combined view and range finding lens receiving light rays for one of said mirrors and located beyond said mirror with respect to the eye of the observer, a shaft or rod mounted in the structure of said casing for movement therein, and means mechanically connecting at all times said shaft or rod both with said negative lens and said front support to secure conjoint movement of the negative lens and said front support, whereby it is unnecessary mechanically to connect and disconnect the parts respectively upon opening and closing the camera, or to rely upon merely touching contact to secure simultaneous movement of the negative lens and the front support, and a range-finder focusing cam on the camera casing cooperating with said mechanically connecting means.

2. A focusing mechanism for the purpose of determining the position of the lens of a camera so that it shall focus on the plate or film of the camera objects at varying distances from the objective lens of the camera, including: a camera casing having a movable objective lens; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced, structurally separate mirrors stationarily mounted as a part of the camera and relatively positioned and spaced to co-act as a part of the range finder, and both being operatively positioned with respect to the said combined viewing and range finder lens; a negative lens constituting a part of the range finder and movably mounted as a part of the camera structure between two said mirrors; a shaft-like member rotatably mounted in a part of the camera structure and operatively connected in all positions of the objective lens to move the same in the range finding adjusting operation, said two lenses of the combined view and range finder being of complementary colors; and means operatively connecting said rotatably mounted shaft-like member and said movable objective lens and a range-finder focusing-cam on the camera casing with which said means cooperates so that focusing movement of the objective lens turns said rotatable shaft-like member and thereby moves said negative lens in effecting the range finding function.

3. A focusing mechanism for the purpose of determining the position of the lens of a camera so that it shall focus on the plate or film of the camera objects at varying distances from the objective lens of the camera, including: a camera casing having an objective lens movable to and fro in the focusing operation; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced, structurally separate mirrors stationarily mounted as a part of the camera and relatively positioned and spaced to co-act as a part of the range finder, and both being operatively positioned with respect to the said combined viewing and range finder lens; a negative lens constituting a part of the range finder and movably mounted as a part of the camera structure between said two mirrors; and a shaft rotatably mounted in the camera casing and structurally connected both to said last mentioned negative lens and to said movable objective lens, and a range-finder focusing cam on the camera casing cooperating with the said combined view and range finder, so that focusing movement of the objective lens moves said negative lens in effecting the range finding function.

4. A focusing mechanism for the purpose of determining the position of the lens of a camera so that it shall focus on the plate or film of the camera objects at varying distances from the objective lens of the camera, including: a camera casing having an objective lens movable in the focusing operation; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced and structurally separate mirrors stationarily mounted as a part of the camera and relatively positioned and spaced to co-act as a part of the range finder, and both being operatively positioned with respect to the said combined viewing and range finder lens; a negative lens constituting a part of the range finder and positioned between the said two mirrors; an arm pivoted in the camera structure and carrying said negative lens; a shaft mounted in the camera structure for rotating movement; a cam carried by said shaft and directly engaging said arm that carries the negative lens; and means mechanically connecting said shaft and said movable objective lens so that focusing movement of the latter turns said cam and thereby moves said negative lens in effecting the range finding function.

5. A focusing mechanism for the purpose of determining the position of the lens of a camera so that it shall focus on the plate or film of the camera objects at varying distances from the objective lens of the camera, including: a camera casing having a movable front support carrying an objective lens; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced and structurally separate mirrors stationarily mounted as a part of the camera and relatively positioned and spaced to co-act as a part of the range finder, and both being operatively positioned with respect to the said combined viewing and range finder lens, a negative lens constituting a part of the range finder and movably mounted as a part of the camera structure between two said mirrors; a movable member mounted on said movable front support; a stationary focusing cam on the camera casing adapted to act upon said movable member when said movable front support is moved in the focusing operation and said movable member rides along said focusing cam; and means mechanically connecting said movable member and the said negative lens between the mirrors, so that said movable camera front support and said negative lens move conjointly in the range finding operation.

6. A focusing mechanism for the purpose of determining the position of the lens of a camera so that it shall focus on the plate or film of the camera objects at varying distances from the objective lens of the camera, including: a camera casing having a movable front support carrying an objective lens; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced and structurally separate mirrors stationarily mounted as a part of the camera and relatively positioned and spaced to co-act as a part of the range finder, and both being operatively positioned with respect to the said combined viewing and range finder lens, a negative lens constituting a part of the range finder and movably mounted as a part of the camera structure between two said mirrors; a movable member mounted on said movable front support; two stationary focusing cams on the camera casing, and respectively adapted in the focusing movement of the camera front support to be engaged by and to act upon the movable member on said camera front support; and means mechanically connecting said movable member and the said negative lens between the mirrors, so that said movable camera front support and said negative lens move conjointly in the range finding operation.

7. A focusing mechanism for the purpose of determining the position of the lens of a camera so that it shall focus on the plate or film of the camera objects at varying distances from the objective lens of the camera, including: a camera casing having a movable front support carrying an objective lens; a combined view and range finder attached to the camera casing so as to be a part of the camera structure, said combined view and range finder having as a part thereof a combined viewing and range finding lens of such size and so mounted that the exact image of the subject being photographed by the camera is seen through said lens while the range finder adjusting operation is taking place; two spaced and structurally separate mirrors stationarily mounted as a part of the camera and relatively positioned and spaced to co-act as a part of the range finder, and both being operatively positioned with respect to the said combined viewing and range finder lens, a negative lens constituting a part of the range finder and movably mounted as a part of the camera structure between two said mirrors; a movable member mounted on said movable front support; a stationary focusing cam on the camera casing adapted to act upon said movable member when said movable front support is moved in the focusing operation and as said movable member rides along said cam; a shaft mounted upright in the camera casing; means mechanically connecting said movable member on the movable front support of the camera with said shaft; and means mechanically connecting said shaft with the movable mounting of said negative lens between the mirrors, so that said movable camera front support and said lens move conjointly in the range finding operation.

8. A combined view and range finder and camera mechanism functionally equipped therewith having, in combination, a camera casing provided with a wall adapted to be opened out for use as a bed, said casing having therein a front support for the objective lens movable to and fro for focusing purposes along said bed, the combined view and range finder attached to the camera casing and having a fixed mirror 72 that is both a light ray reflecting and transmitting mirror and a fixed mirror 75 that is a reflecting mirror, and a negative lens between said mirrors and movable in the functioning of the said range finder and also having a combined viewing and range finding lens 26 receiving light rays for said mirror 72 and located beyond the same with respect to the eye of the observer, a shaft or rod 60 mounted in said camera casing for rocking movement therein, and means mechanically connected at all times to said shaft or rod, and to said negative lens and said front support to secure conjoint movement of the said negative lens and said front support, and render it unnecessary mechanically to connect and disconnect said parts respectively upon opening and closing the camera, and a range-finder focusing cam on the camera casing cooperating with said mechanically connected means.

EDSON S. HINELINE.